(12) United States Patent
Hattori et al.

(10) Patent No.: US 7,166,318 B2
(45) Date of Patent: Jan. 23, 2007

(54) PRODUCTION METHOD AND PRODUCTION APPARATUS FOR MAGNETIC RECORDING MEDIUM

(75) Inventors: Kazuhiro Hattori, Tokyo (JP); Mitsuru Takai, Tokyo (JP); Takahiro Suwa, Tokyo (JP)

(73) Assignee: TDK Corporation, Tokyo (JP)

( * ) Notice: Subject to any disclaimer, the term of this patent is extended or adjusted under 35 U.S.C. 154(b) by 21 days.

(21) Appl. No.: 10/791,712

(22) Filed: Mar. 4, 2004

(65) Prior Publication Data

US 2004/0175510 A1 Sep. 9, 2004

(30) Foreign Application Priority Data

Mar. 5, 2003 (JP) .............................. 2003-058381
Apr. 4, 2003 (JP) .............................. 2003-101570

(51) Int. Cl.
*B05D 5/12* (2006.01)

(52) U.S. Cl. ..................... 427/127; 427/129; 427/130; 427/131; 118/715

(58) Field of Classification Search ................ 427/127, 427/128, 129, 130, 131; 118/715
See application file for complete search history.

(56) References Cited

U.S. PATENT DOCUMENTS

| | | | | |
|---|---|---|---|---|
| 2001/0020516 A1* | 9/2001 | Khan et al. | .................. | 156/345 |
| 2005/0147793 A1* | 7/2005 | Kruger et al. | ............... | 428/119 |
| 2005/0167770 A1* | 8/2005 | Fukuzawa et al. | .......... | 257/421 |

FOREIGN PATENT DOCUMENTS

| JP | A-3-40219 | 2/1991 |
|---|---|---|
| JP | A 9-97419 | 4/1997 |
| JP | A 2000-91290 | 3/2000 |
| JP | A-2000-268338 | 9/2000 |
| JP | A 2000-322710 | 11/2000 |
| JP | A-2001-216633 | 8/2001 |
| JP | A 2001-323381 | 11/2001 |
| JP | A-2002-523852 | 7/2002 |

\* cited by examiner

*Primary Examiner*—Alain L. Bashore
(74) *Attorney, Agent, or Firm*—Oliff & Berridge, PLC

(57) ABSTRACT

A production method and a production apparatus for a magnetic recording medium, which enable the efficient production of a discrete type magnetic recording medium, while reliably preventing any deterioration of the partitioned recording elements. The magnetic recording medium production apparatus includes: recording layer processing device, which by forming a plurality of grooves, with a spacing therebetween in a planar direction, in an intermediate product of a magnetic recording medium comprising a continuous recording layer, partitions the continuous recording layer into a plurality of partitioned recording elements; non-magnetic body filling device for filling the grooves between the partitioned recording elements with a non-magnetic body; smoothing device for smoothing the surface of the partitioned recording elements and the non-magnetic body; protective layer formation device for forming a protective layer on the partitioned recording elements and the non-magnetic body; and vacuum retention device which houses the recording layer processing device, the non-magnetic body filling device, the smoothing device, and the protective layer formation device, and maintains the environment surrounding the intermediate product in a state of vacuum.

11 Claims, 10 Drawing Sheets

PRODUCTION METHOD AND PRODUCTION APPARATUS FOR MAGNETIC RECORDING MEDIUM

BACKGROUND OF THE INVENTION

1. Field of the Invention

The present invention relates to a production method and a production apparatus for a magnetic recording medium.

2. Description of the Related Art

In recent years, magnetic recording media such as hard disks and the like have undergone significant increases in recording density as a result of improvements including miniaturization of the magnetic particles that make up the recording layer, development of new materials, and miniaturization of head processing technology, and it is envisaged that the future will bring further increases in recording density.

However, increasing the recording density by conventional improvement techniques such as miniaturization of the magnetic particles has now reached its limit, and discrete type magnetic recording media, in which a continuous recording layer is partitioned into a plurality of partitioned recording elements, and a non-magnetic body is then used to fill the grooves between these partitioned recording elements, have been proposed (for example, see Japanese Patent Laid-Open Publication No. Hei 9-97419) as an example of magnetic recording media which will enable further improvements in recording density.

Dry etching techniques such as reactive ion etching are examples of processing techniques that can be used to create minute partitions within a continuous recording layer (for example, see Japanese Patent Laid-Open Publication No. Hei 12-322710).

Furthermore, embedding techniques that utilize wet processes such as those used in the field of semiconductor production (for example, see Japanese Patent Laid-Open Publication No. Hei 13-323381) can be used to achieve the non-magnetic filling described above.

If level differences occur between the surfaces of the partitioned recording elements and the non-magnetic body then problems such as instability of the head flying movement and the accumulation of foreign matter can arise, and consequently the surface of the partitioned recording elements and the non-magnetic body are preferably smoothed. This smoothing operation can also be conducted using processing techniques used in the field of semiconductor production, such as CMP (Chemical Mechanical Polishing) techniques based on wet processes.

In addition, a wet cleaning technique used in semiconductor production (for example, see Japanese Patent Laid-Open Publication No. Hei 12-091290) can be used for removing foreign matter from the surface of the partitioned recording elements.

However, if the type of dry etching used in a semiconductor production process is used, as is, for processing a continuous recording layer, then sections of the partitioned recording elements are prone to problems of deterioration such as oxidation and corrosion. Deterioration of the partitioned recording elements may also occur over a period of time following production. In addition, the action of solvents and the like during other wet processes such as cleaning can also cause problems such as oxidation and corrosion within some sections of the partitioned recording elements. Another problem arises in that the use of wet processes increases the likelihood of contamination of the surface of the partitioned recording elements with foreign matter. These problems of deterioration and contamination of the partitioned recording elements can cause a loss of precision in the recording and reading of information.

Furthermore, combining dry processes and wet processes creates additional problems in that transportation of work (intermediates products of the magnetic recording medium) becomes more difficult, and production efficiency deteriorates.

In other words, because magnetic recording media have unique problems, including the fact that the magnetic material tends to be prone to oxidation, the use of processing techniques that are effective within other fields, such as semiconductor production, during the production of magnetic recording media results in a variety of problems such as oxidation of the magnetic material, and accordingly producing discrete type magnetic recording media with good efficiency, while preventing deterioration of the partitioned recording elements, has proven to be very difficult.

SUMMARY OF THE INVENTION

The present invention takes the problems described above into consideration, and has an object of providing a production method and a production apparatus for a magnetic recording medium, which enable the efficient production of a discrete type magnetic recording medium, while reliably preventing any deterioration of the partitioned recording elements.

The present invention is able to resolve the above problems by maintaining the work environment in a state of vacuum, and conducting processing of the continuous recording layer using dry processes. Completely isolating the partitioned recording elements from the atmosphere is very effective in reliably preventing any deterioration of the partitioned recording elements, and consequently the steps from the formation of the partitioned recording elements through to the formation of the protective layer are preferably all conducted with the work environment maintained in a state of vacuum.

In this specification, the term "vacuum" is not restricted to the definition of a state in which the air pressure is 0 [Pa], but rather defines a state of extremely low air pressure in which the pressure is within a range from approx. 0 to 100 [Pa]. Furthermore, the term "magnetic recording medium" is not restricted to hard disks, floppy disks (registered trademark) and magnetic tapes and the like, which use only magnetism for the recording and reading of information, but also includes magneto-optical recording media such as MO (Magnet Optical) disks which combine both magnetic and optical characteristics.

Accordingly, various exemplary embodiments of this invention provide as described below.

(1) A method of producing a magnetic recording medium comprising: a recording layer processing step, which by forming a plurality of grooves, with a spacing therebetween in the planar direction, in an intermediate product produced by forming a continuous recording layer on top of a substrate surface, partitions the continuous recording layer into a plurality of partitioned recording elements; a non-magnetic body filling step for filling the grooves between the partitioned recording elements with a non-magnetic body; and a protective layer formation step for forming a protective layer that protects the partitioned recording elements and the non-magnetic body, wherein the recording layer processing step is conducted with the environment surrounding the intermediate product maintained in a state of vacuum.

(2) The method of producing a magnetic recording medium according to (1), wherein said recording layer processing step, said non-magnetic body filling step, and said protective layer formation step are conducted sequentially with an environment surrounding said intermediate product maintained in a state of vacuum.

(3) The method of producing a magnetic recording medium according to (1) or (2), wherein a dry process cleaning step, which uses either one of a gas and a plasma for removing foreign matter from an environment surrounding said partitioned recording elements, is provided between said recording layer processing step and said non-magnetic body filling step.

(4) The method of producing a magnetic recording medium according to any one of (1) through (3), wherein a smoothing step for smoothing a surface of said partitioned recording elements and said non-magnetic body is provided between said non-magnetic body filling step and said protective layer formation step.

(5) The method of producing a magnetic recording medium according to (4), wherein said smoothing step is a dry plasma step which allows ions to collide with a surface of said partitioned recording elements and said non-magnetic body at an incidence angle that is restricted to a value within either one of a range from −10 to 15° and a range from 60 to 90°.

(6) The method of producing a magnetic recording medium according to (5), wherein said dry plasma step uses ion beam etching.

(7) The method of producing a magnetic recording medium according to any one of (1) through (6), wherein in said recording layer processing step, said continuous recording layer is partitioned by reactive ion etching using carbon monoxide gas containing an added nitrogen based compound as a reactive gas.

(8) The method of producing a magnetic recording medium according to any one of (1) through (7), wherein in said non-magnetic body filling step, said non-magnetic body is used to fill said grooves between said partitioned recording elements using either one of plasma CVD with bias power to said intermediate product and bias sputtering.

(9) The method of producing a magnetic recording medium according to (8), wherein said non-magnetic body filling step uses a material comprising any one selected from the group consisting of an oxide material, a nitride material, and a non-magnetic amorphous material as said non-magnetic body.

(10) The method of producing a magnetic recording medium according to (9), wherein said non-magnetic body filling step uses silicon dioxide as said non-magnetic body.

(11) The method of producing a magnetic recording medium according to any one of (8) through (10), wherein a barrier film formation step, which uses either one of a plasma CVD method and a sputtering method for forming a barrier film on said partitioned recording elements, is provided between said recording layer processing step and said non-magnetic body filling step.

(12) The method of producing a magnetic recording medium according to (11), wherein said barrier film formation step forms a barrier film of diamond-like carbon.

(13) A production apparatus for a magnetic recording medium comprising:

recording layer processing device, which by forming a plurality of grooves, with a spacing therebetween in a planar direction, in an intermediate product produced by forming a continuous recording layer on top of a substrate surface, partitions said continuous recording layer into a plurality of partitioned recording elements; and vacuum retention device, which houses said recording layer processing device, and maintains an environment surrounding said intermediate product in a state of vacuum.

(14) The production apparatus for a magnetic recording medium according to (13), wherein non-magnetic body filling device for filling said grooves, between said partitioned recording elements with a non-magnetic body, and protective layer formation device for forming a protective layer that protects said partitioned recording elements and said non-magnetic body are provided inside said vacuum retention device.

(15) The production apparatus for a magnetic recording medium according to (13) or (14), wherein dry process cleaning device for removing foreign matter from an environment surrounding said partitioned recording elements using either one of a gas and a plasma is provided inside said vacuum retention device.

(16) The production apparatus for a magnetic recording medium according to any one of (13) through (15), wherein barrier film formation device for forming a barrier film on said partitioned recording elements using either one of a plasma CVD method and a sputtering method is provided inside said vacuum retention device.

(17) The production apparatus for a magnetic recording medium according to any one of (13) through (16), wherein smoothing device for smoothing a surface of said partitioned recording elements and said non-magnetic body is provided inside said vacuum retention device.

In this specification, the term "barrier film" is used to describe a thin film that separates the partitioned recording elements from the non-magnetic body.

Furthermore, the term "diamond-like carbon" (hereafter abbreviated as DLC) is used to describe a material with an amorphous structure containing carbon as the primary component, with a Vickers hardness within a range from 200 to 8000 kgf/mm$^2$.

DETAILED DESCRIPTION OF THE PREFERRED EMBODIMENTS

As follows is a detailed description of embodiments of the present invention, with reference to the drawings.

Figure 1:
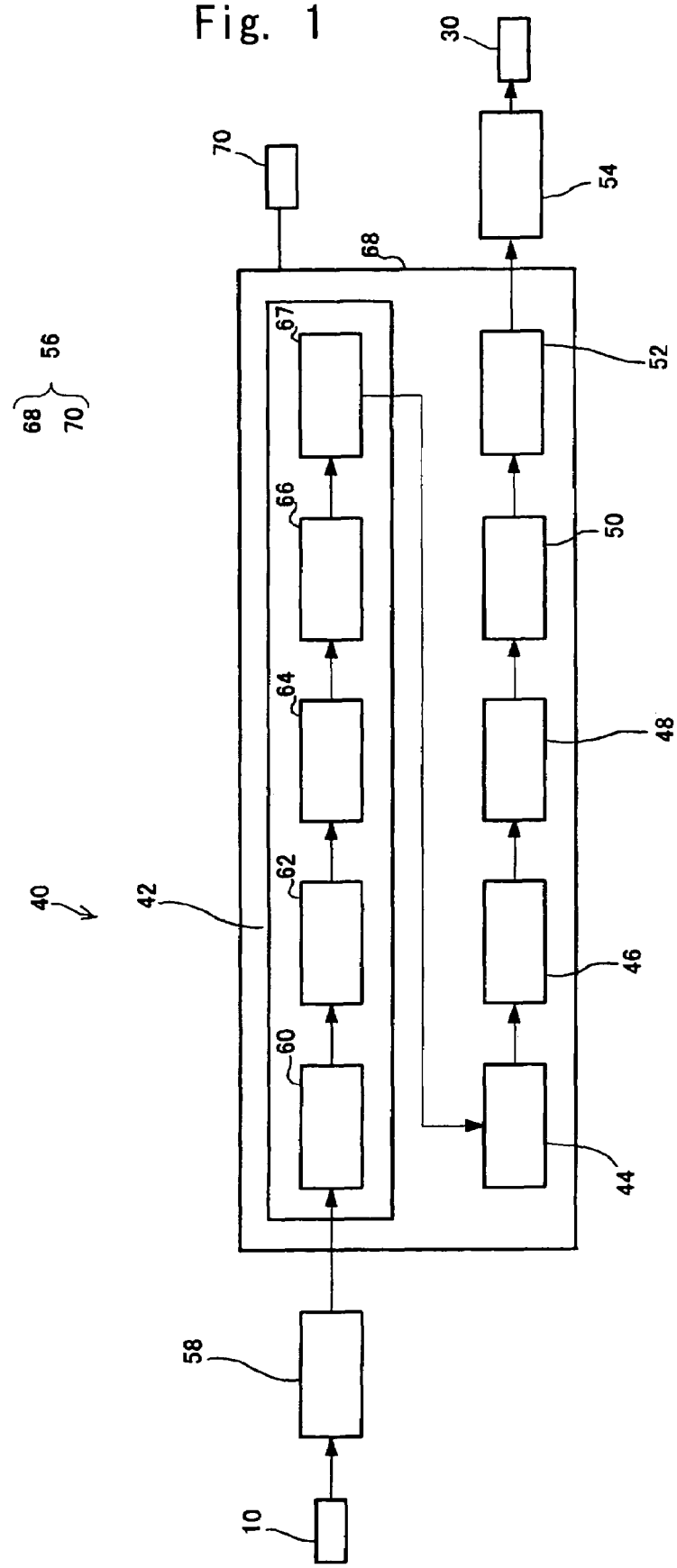
FIG. 1 is a block diagram showing a schematic illustration of the structure of a production apparatus for a magnetic recording medium according to an embodiment of the present invention.

FIG. 1 is a block diagram showing a schematic illustration of the structure of a production apparatus for a magnetic recording medium according to an embodiment of the present invention.

First, in order to facilitate a better understanding of the structure of the production apparatus for magnetic recording media, a simple description is given of the structures of the magnetic recording medium intermediate product and the magnetic recording medium itself.

Figure 2:
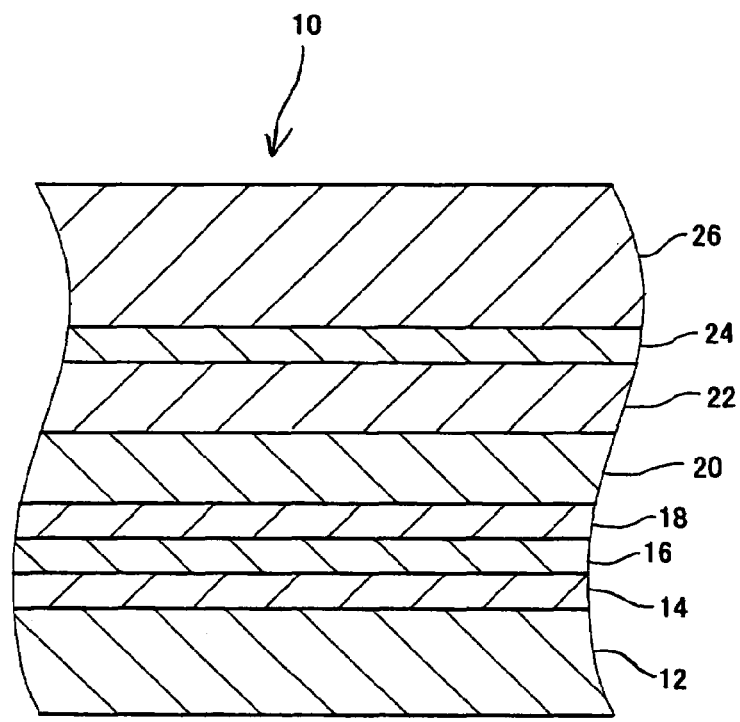
FIG. 2 is a side sectional view showing a schematic illustration of the structure of an intermediate product of a magnetic recording medium prior to processing with the same production apparatus.

As shown in FIG. 2, the magnetic recording medium intermediate product 10 comprises a glass substrate 12 with a backing layer 14, a soft magnetic layer 16, an orientation layer 18, a continuous recording layer 20, a first mask-layer 22, a second mask layer 24, and a third mask layer 26 formed sequentially thereon.

The material of the backing layer 14 is either Cr (chromium) or a Cr alloy, the material of the soft magnetic layer 16 is an Fe (iron) alloy or a Co (cobalt) alloy, the material of the orientation layer 18 is CoO, MgO or NiO or the like, and the material of the continuous recording layer 20 is a Co (cobalt) alloy. Furthermore, the materials of each of the mask layers are TiN (titanium nitride) for the first mask layer 22, Ni (nickel) for the second mask layer 24, and a negative resist (NEB22A, manufactured by Sumitomo Chemical Co., Ltd.) for the third mask layer 26.

Figure 3:
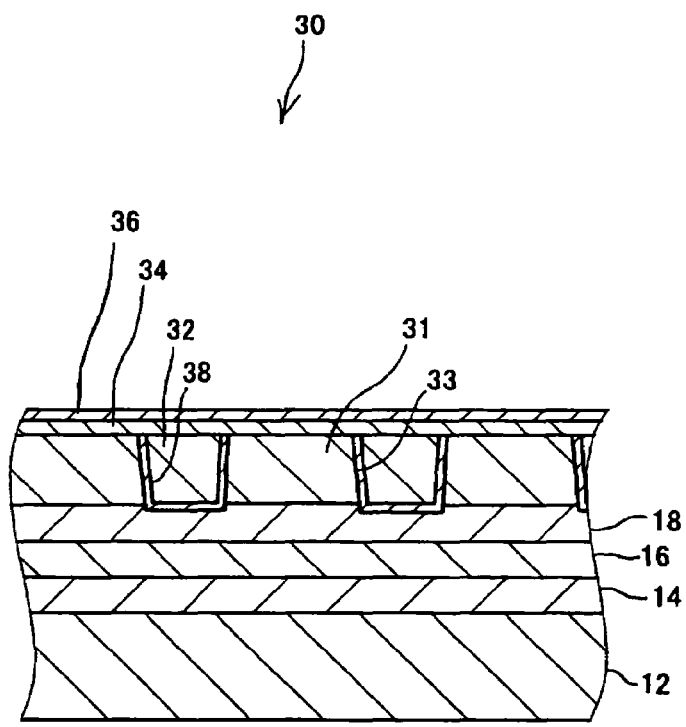
FIG. 3 is a side sectional view showing a schematic illustration of the structure of a magnetic recording medium following processing with the same production apparatus.

As shown in FIG. 3, the magnetic recording medium 30 is a perpendicular recording, discrete type recording disk, wherein the continuous recording layer 20 is partitioned into a plurality of partitioned recording elements 31 by spacings formed along the radial direction of the tracks, a non-magnetic body 32 fills the grooves 33 between the partitioned recording elements 31, and a protective-layer 34 and a lubricating layer 36 are formed sequentially on top of the partitioned recording elements 31 and the non-magnetic body 32. body 32. A barrier film 38 is formed between the partitioned recording elements 31 and the non-magnetic body 32.

The material of the non-magnetic body 32 is $SiO_2$ (silicon dioxide), the material for both the protective layer 34 and the barrier film 38 is the hard carbon film known as DLC described above, and the material of the lubricating layer 36 is PFPE (perfluoropolyether).

Returning to FIG. 1, the magnetic recording medium production apparatus 40 comprises recording layer processing device 42 for forming the partitioned recording elements 31 by forming the grooves 33 in the intermediate product 10, dry process cleaning device 44 for removing foreign matter from the environment surrounding the partitioned recording elements 31, barrier film formation device 46 for forming the barrier film 38 on the partitioned recording elements 31, non-magnetic body filling device 48 for filling the grooves 33 between the partitioned recording elements 31 with the non-magnetic body 32, smoothing device 50 for smoothing the surface of the partitioned recording elements 31 and the non-magnetic body 32, protective layer formation device 52 for forming the protective layer 34 on the partitioned recording elements 31 and the non-magnetic body 32, and vacuum retention device 56 which houses the recording layer processing device 42, the dry process cleaning device 44, the barrier film formation device 46, the non-magnetic body filling device 48, the smoothing device 50, and the protective layer formation device 52, and maintains the environment surrounding the intermediate product 10 in a state of vacuum.

In addition, the production apparatus 40 also comprises transfer device 58 for transferring a partition pattern onto the third mask layer 26 of the magnetic recording medium intermediate product 10, and lubricating layer formation device 54 for forming the lubricating layer 36 on top of the protective layer 34. The transfer device 58 and the lubricating layer formation device 54 are positioned outside the vacuum retention device 56.

The recording layer processing device 42 comprises a plasma processing device 60 for processing the third mask layer 26 with a plasma utilizing oxygen, ozone or a mixed gas thereof, an ion beam etching device 62 for processing the second mask layer 24 with ion beam etching utilizing Ar (argon) gas, a first reactive ion etching device 64 for processing the first mask layer 22 with reactive ion etching utilizing either $CF_4$ (tetrafluoromethane) gas or $SF_6$ (sulfur hexafluoride) gas, a second reactive ion etching device 66 for processing the continuous recording layer 20 with reactive ion etching utilizing CO (carbon monoxide) gas containing added $NH_3$ (ammonia) gas, and a third reactive ion etching device 67 for removing those sections of the first mask layer 22 remaining on the surface of the partitioned recording elements 31 with reactive ion etching utilizing either $CF_4$ gas or $SF_6$ gas.

The dry process cleaning device 44 is a dry process cleaning device that utilizes a plasma.

The barrier film formation device 46 is a CVD (Chemical Vapor Deposition) device for forming the DLC barrier film 38 using CVD.

The non-magnetic body filling device 48 is a bias sputtering device for forming a film of the $SiO_2$ non-magnetic body 32 on top of the partitioned recording elements 31 using bias sputtering.

The smoothing device 50 is an ion beam etching device for smoothing the medium surface using ion beam etching with Ar gas.

The protective layer formation device 52 is a CVD device for forming the protective layer 34 of DLC using CVD.

The lubricating layer formation device 54 is an application device for applying a lubricating layer 36 of PFPE using dipping.

The vacuum retention device 56 comprises a vacuum chamber 68, and a vacuum pump 70 that interconnects with the vacuum chamber 68.

The transfer device 58 is a press device that utilizes a nano-imprint method to press and transfer a pattern (not shown in the drawings) prepared using lithography onto the third mask layer 26.

Next is a description of the actions of the magnetic recording medium production apparatus 40.

Figure 4:
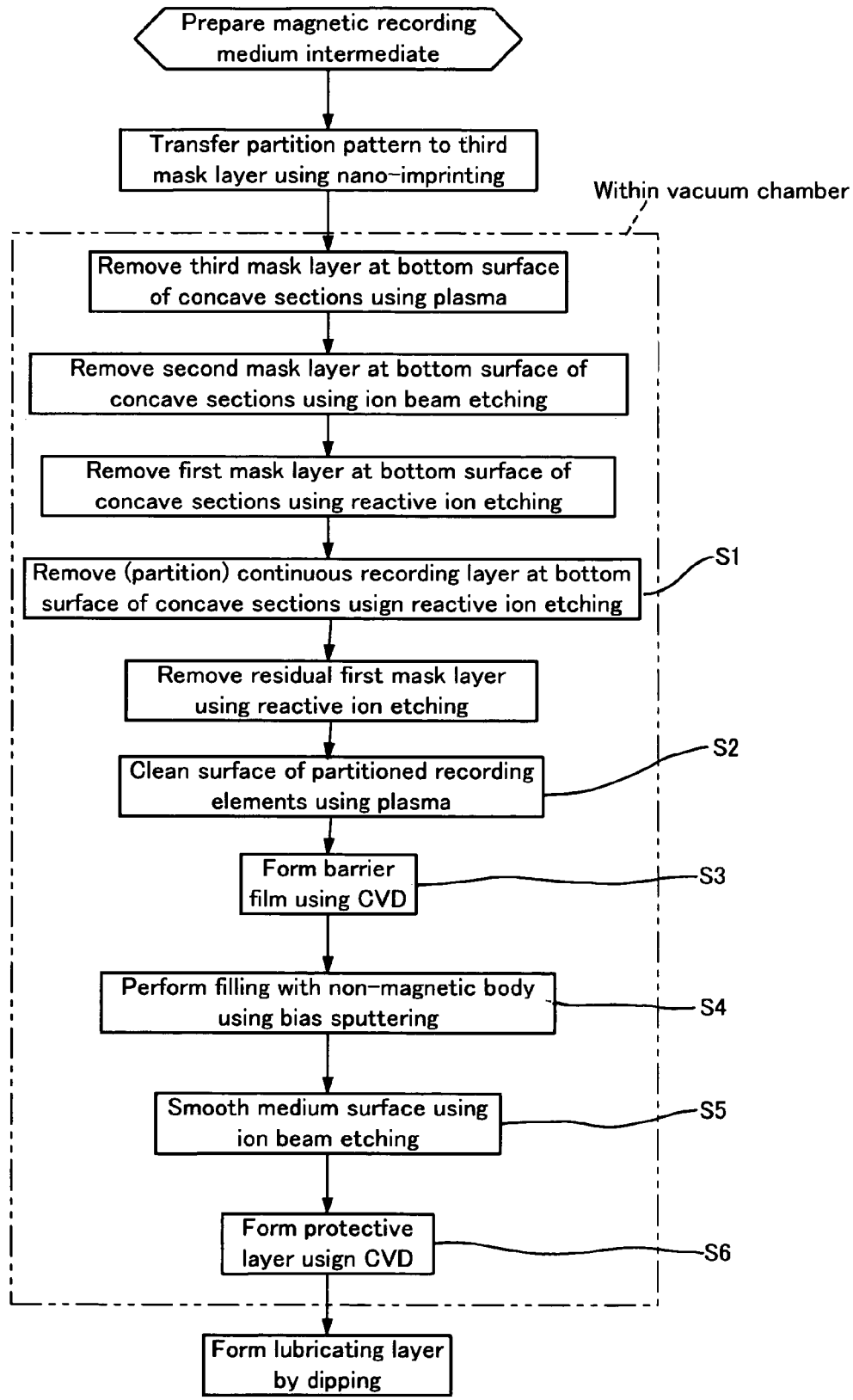
FIG. 4 is a flowchart showing the steps for producing a magnetic recording medium with the same production apparatus.

FIG. 4 is a flowchart showing the flow of processing for the magnetic recording medium production apparatus 40.

First, a magnetic recording medium intermediate product 10 is prepared. The intermediate product 10 is formed by using sputtering to form sequentially, on top of a glass substrate 12, a backing layer 14 with a thickness of 300 to 2000 Å, a soft magnetic layer 16 with a thickness of 500 to 3000 Å, an orientation layer 18 with a thickness of 30 to 300 Å, a continuous recording layer 20 with a thickness of 100 to 300 Å, a first mask layer 22 with a thickness of 100 to 500 Å, and a second mask layer 24 with a thickness of 100 to 300 Å, and then using either spin coating or dipping to form a third mask layer 26 with a thickness of 300 to 3000 Å.

Figure 5:
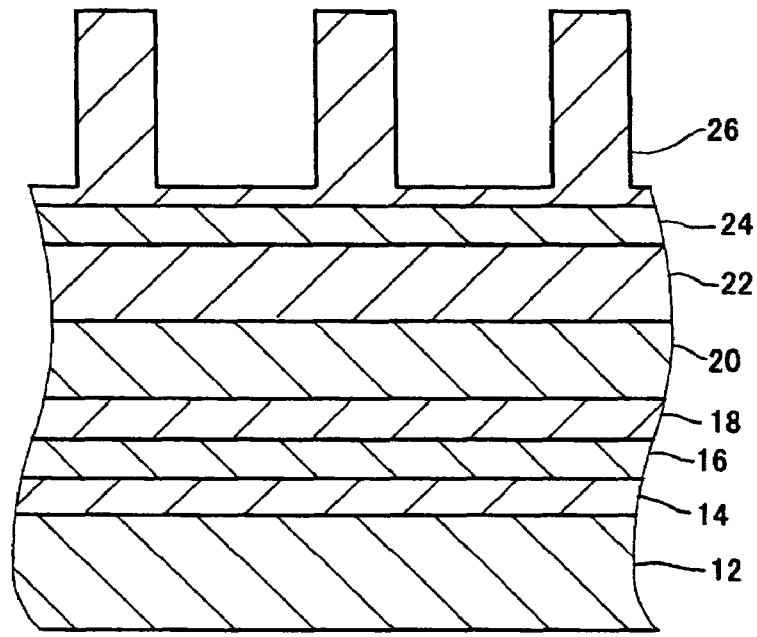
FIG. 5 is a side sectional view showing a schematic illustration of the shape of the above intermediate product following the transfer of a partition pattern into the third mask layer.

The transfer device 58 then uses a nano-imprint method to transfer the type of concave sections shown in FIG. 5, which correspond with the partition pattern for the partitioned recording elements 31, into the third mask layer 26 of the intermediate product 10.

Figure 6:
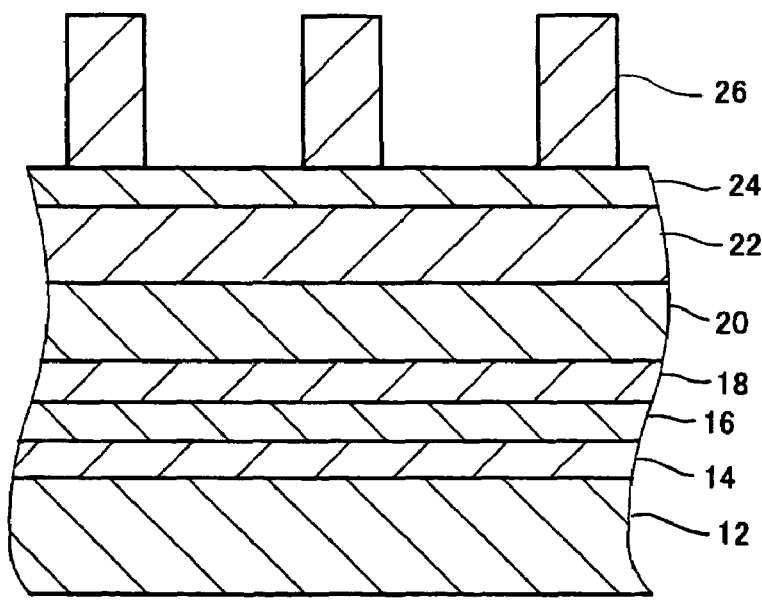
FIG. 6 is a side sectional view showing a schematic illustration of the shape of the above intermediate product following the removal of those sections of the third mask layer at the bottom surfaces of the concave sections.

At this point the intermediate product 10 is transported into the vacuum chamber 68, and the plasma processing device 60 is used to process the third mask layer 26 until those sections of the third mask layer 26 at the bottom surfaces of the concave sections have been removed, as shown in FIG. 6. Those areas of the third mask layer 26 outside the concave sections are also partially removed, but the level difference between these other areas and the bottom surfaces of the concave sections is retained.

Figure 7:
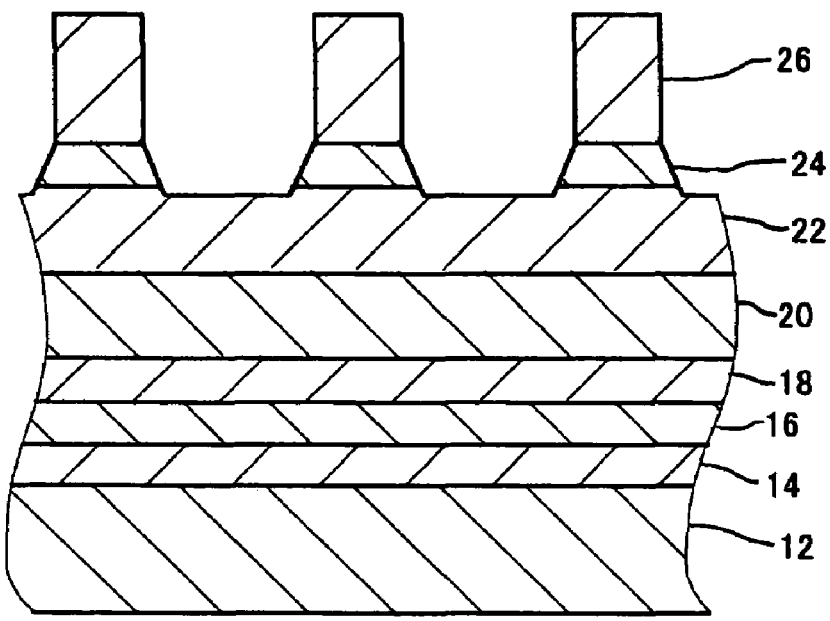
FIG. 7 is a side sectional view showing a schematic illustration of the shape of the above intermediate product following the removal of those sections of the second mask layer at the bottom surfaces of the concave sections.

Next, the ion beam etching device 62 is used to remove those sections of the second mask layer 24 at the bottom surfaces of the concave sections, as shown in FIG. 7. During this process a small quantity of the first mask layer 22 is also removed. Furthermore, a large proportion of those areas of the third mask layer 26 outside the concave sections is also removed, although a small quantity still remains.

Figure 8:
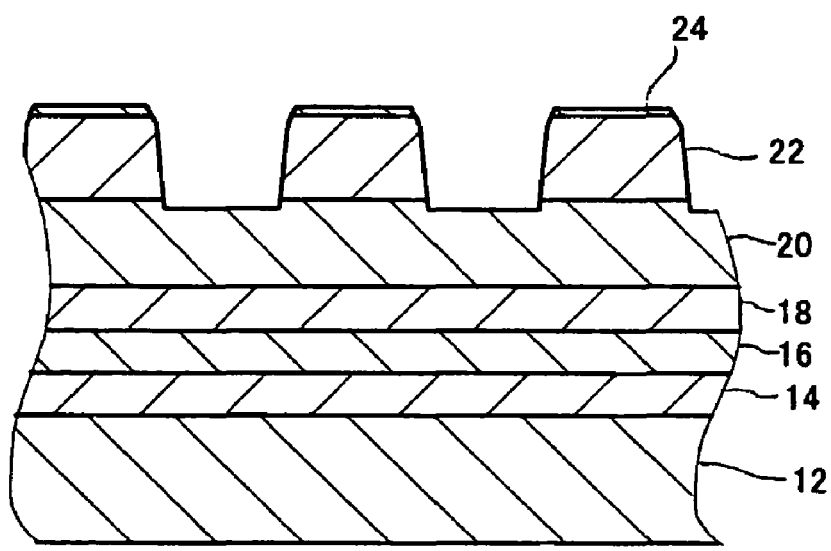
FIG. 8 is a side sectional view showing a schematic illustration of the shape of the above intermediate product following the removal of those sections of the first mask layer at the bottom surfaces of the concave sections.

Subsequently, the first reactive ion etching device 64 is used to remove those sections of the first mask layer 22 at the bottom surfaces of the concave sections, as shown in FIG. 8. At this time, the remaining quantity of those areas of the third mask layer 26 outside the concave sections is completely removed. Furthermore, a large proportion of those areas of the second mask layer 24 outside the concave sections is also removed, although a small quantity still remains.

Figure 9:
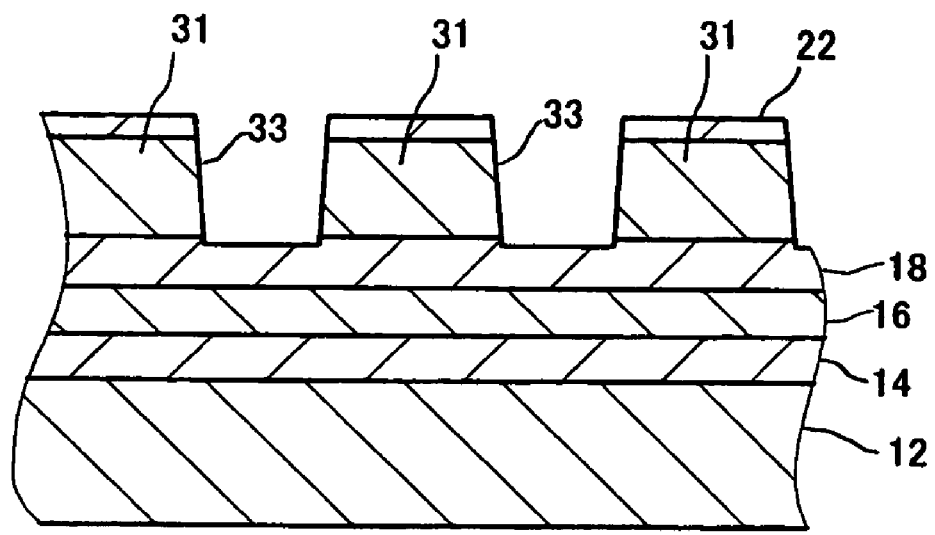
FIG. 9 is a side sectional view showing a schematic illustration of the shape of the above intermediate product with the partitioned recording elements formed.

Next, the second reactive ion etching device 66 is used to remove those sections of the continuous recording layer 20 at the bottom surfaces of the concave sections, thus partitioning the continuous recording layer 20 into a plurality of partitioned recording elements 31 with grooves 33 formed between the partitioned recording elements 31, as shown in FIG. 9 (S1).

During this process a small quantity of the orientation layer 18 is also removed. Furthermore, the remaining quantity of those areas of the second mask layer 24 outside the concave sections is completely removed, and a large proportion of those areas of the first mask layer 22 outside the concave sections is also removed, although a small quantity still remains on the upper surface of the partitioned recording elements 31.

Figure 10:
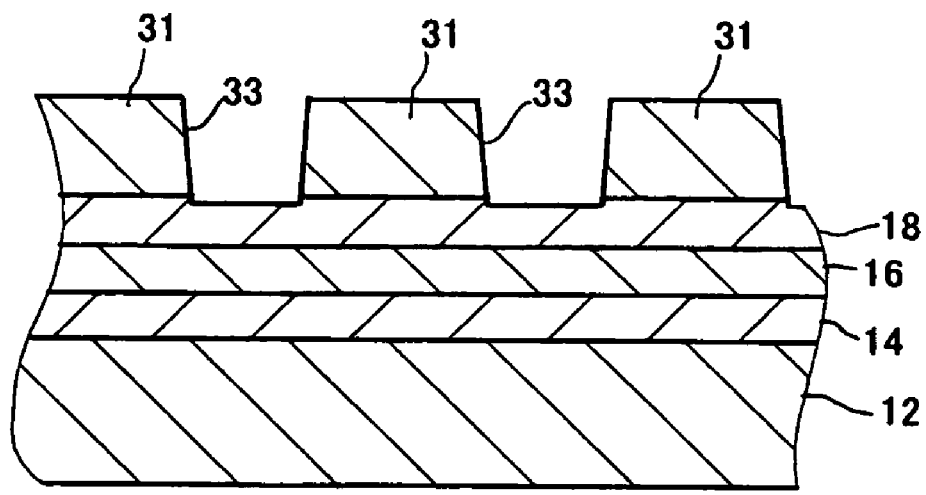
FIG. 10 is a side sectional view showing a schematic illustration of the shape of the above intermediate product following the removal of those sections of the first mask layer remaining on the upper surface of the partitioned recording elements.

This residual first mask layer 22 is completely removed with the third reactive ion etching device 67, as shown in FIG. 10.

At this point, the dry process cleaning device 44 is used to remove foreign matter from the surface of the partitioned recording elements 31 (S2).

Figure 11:
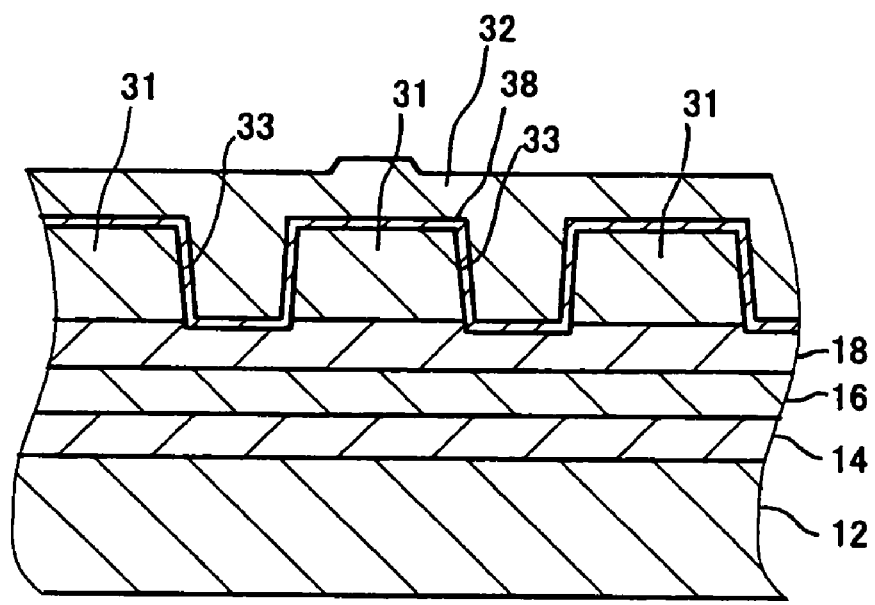
FIG. 11 is a side sectional view showing a schematic illustration of the shape of the above intermediate product following filling of the spaces between the partitioned recording elements with a non-magnetic body.

Subsequently, as shown in FIG. 11, a CVD device is used to form a barrier film 38 of DLC, with a thickness of 10 to 200 Å, on top of the partitioned recording elements 31 (S3), and the non-magnetic body filling device 48 is then used to fill the grooves 33 between the partitioned recording elements 31 with a non-magnetic body 32, using a bias sputtering method (S4). The non-magnetic body 32 is formed so as to completely cover the-barrier film 38. Because the partitioned recording elements 31 are covered and protected by the barrier film 38, they undergo no deterioration during the bias sputtering of the non-magnetic body 32.

Figure 12:
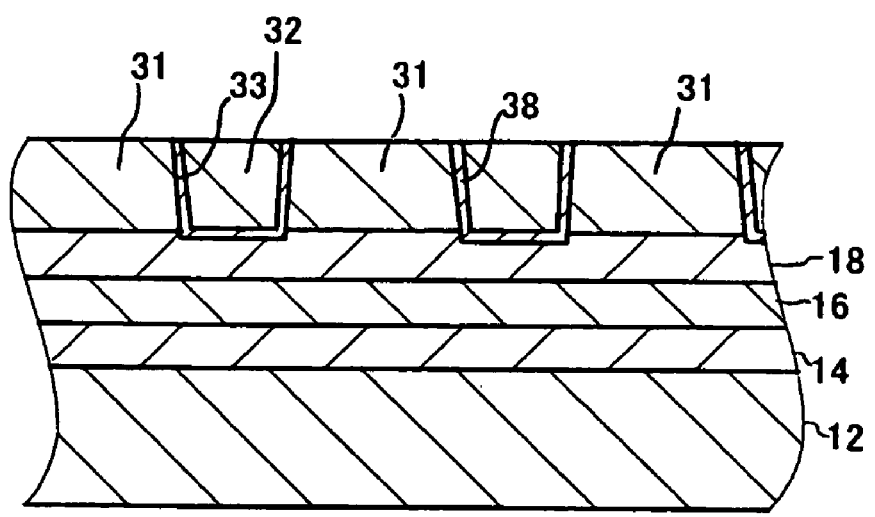
FIG. 12 is a side sectional view showing a schematic illustration of the shape of the above intermediate product following smoothing of the surfaces of the partitioned recording elements and the non-magnetic body.

Next, the smoothing device 50 is used to remove a portion of the non-magnetic body 32 by ion beam etching, until the upper surfaces of the partitioned recording elements 31 are exposed, as shown in FIG. 12, thereby smoothing the surface of the partitioned recording elements 31 and the non-magnetic body 32 (S5). During this process, in order to ensure high precision smoothing, the incidence angle of the Ar ions is preferably set within a range from −10 to 15° relative to the surface. However if the surface of the partitioned recording elements 31 and the non-magnetic body 32 has been produced with a good level of smoothness during the non-magnetic body filling step, then the incidence angle of the Ar ions may be set within a range from 60 to 90°. This type of increased incidence angle increases the processing speed, and enables an improvement in productivity. The barrier film 38 on the upper surface of the partitioned recording elements 31 may be either completely removed, or a portion may be left intact, although the non-magnetic body 32 above the partitioned recording elements 31 is completely removed.

The protective layer formation device 52 then uses a CVD method to form a protective layer 34 of DLC, with a thickness of 10 to 50 Å, on the upper surface of the partitioned recording elements 31 and the non-magnetic body 32 (S6), and the structure is then transported out of the vacuum chamber 68.

Subsequently, the lubricating layer formation device 54 is used to apply a lubricating layer 36 of PFPE, with a thickness of 10 to 20 Å, to the top of the protective layer 34, using a dipping method. This completes the formation of the magnetic recording medium 30 shown in FIG. 3.

Because the formation and processing of the partitioned recording elements 31 is conducted with the environment surrounding the intermediate product 10 in a state of vacuum, deterioration of the partitioned recording elements 31 through oxidation or corrosion can be prevented during processing.

In addition, the intermediate product 10 is transported into the vacuum chamber 68 with the continuous recording layer 20 covered by the various mask layers, and once inside the vacuum chamber 68 the partitioned recording elements 31 are formed, filling of the non-magnetic body 32 is performed, and the protective layer 34 is formed on top of the partitioned recording elements 31 and the non-magnetic body 32 before the magnetic recording medium 30 is transported out of the vacuum chamber 68, and consequently the partitioned recording elements 31 (and the continuous recording layer 20) are isolated from atmospheric oxygen and the like at all times, meaning deterioration of the partitioned recording elements 31 can be even more reliably prevented.

Furthermore, because each of the steps utilizes a dry process, problems that arise when wet processes are used, such as deterioration of the partitioned recording elements 31 caused by the process liquids, or contamination of the surface of the partitioned recording elements 31 caused by foreign matter within the process liquids or cleaning liquids, can be avoided.

In other words, the magnetic recording medium production apparatus 40 displays superior reliability, and is able to reliably prevent deterioration during formation of the partitioned recording elements 31.

Furthermore, because each of the steps utilizes a dry process, transportation of the work in progress is easier than processes which combine wet and dry processes, meaning the magnetic recording medium production apparatus 40 displays good levels of production efficiency.

In the present embodiment, the steps from the etching of the third mask layer 26 through to the formation of the protective layer 34 are all performed inside the vacuum chamber 68, but the present invention is not restricted to this arrangement, and provided the partitioned recording elements 31 and the continuous recording layer 20 are isolated from the atmosphere to prevent deterioration of the partitioned recording elements 31, the steps for processing each of the masks, prior to the processing of the continuous recording layer 20, may also be performed outside of the vacuum chamber 68. However, during processing of the first mask layer 22, sections of the continuous recording layer 20 are exposed (see FIG. 9), and consequently the processing of the first mask layer 22 is preferably conducted inside the vacuum chamber 68.

Furthermore, in the present embodiment three mask layers of different materials are formed on the continuous recording layer 20, and a four-stage dry etching process is then used to form the grooves 33 in the intermediate product 10 and partition the continuous recording layer 20, but there are no particular restrictions on the type of dry etching used, the materials used for the mask layers, the number of mask layers, or the thickness of the mask layers, provided the continuous recording layer 20 is able to be partitioned with a high level of precision.

Furthermore, in the present embodiment a dry process cleaning operation using a plasma is used for removing foreign matter from the surface of the partitioned recording elements 31, but the present invention is not restricted to this method, and the foreign matter on the surface of the partitioned recording elements 31 could also be removed by a dry process cleaning operation-using a gas.

In addition, in the present embodiment the non-magnetic body filling device 48 uses a bias sputtering method, but the present invention is not restricted to this method, and the filling of the non-magnetic body could also be performed using a plasma CVD method with bias power to said magnetic recording medium intermediate product 10.

Furthermore, in the present embodiment the magnetic recording medium 30 is a perpendicular recording, discrete type magnetic disk in which the partitioned recording elements 31 are arranged with spacings in the track radial direction positioned therebetween, but the present invention is not restricted to this case, and can of course also be applied to the production of magnetic disks in which the partitioned recording elements are arranged with spacings in the track circumferential direction (the sector direction) positioned therebetween, magnetic disks in which the partitioned recording elements are arranged with spacings in both the track radial direction and the track circumferential direction positioned therebetween, and magnetic disks in which the partitioned recording elements form a helical shape. Furthermore, the present invention can also be applied to the production of magneto-optical disks such as MO disks, and other non-disk type discrete type magnetic recording media such as magnetic tapes and the like.

Furthermore, in the present embodiment the magnetic recording medium production apparatus 40 is equipped with a separate processing device for each of the steps, but the present invention is not restricted to such a configuration, and a plurality of steps could also be conducted with a single device. For example, the step for processing the first mask layer 22, and the step for removing the residual first mask layer 22 from the surface of the partitioned recording elements 31 could be conducted using the same reactive ion etching etching device, using either $CF_4$ or $SF_6$ as the reactive gas. In addition, the step for processing the second mask layer 24, and the step for smoothing the partitioned recording elements 31 and the non-magnetic body 32 could be conducted using the same Ar gas ion beam etching device. These rationalizations enable reductions in both the size and the cost of the production apparatus.

EXAMPLE

Figure 13:
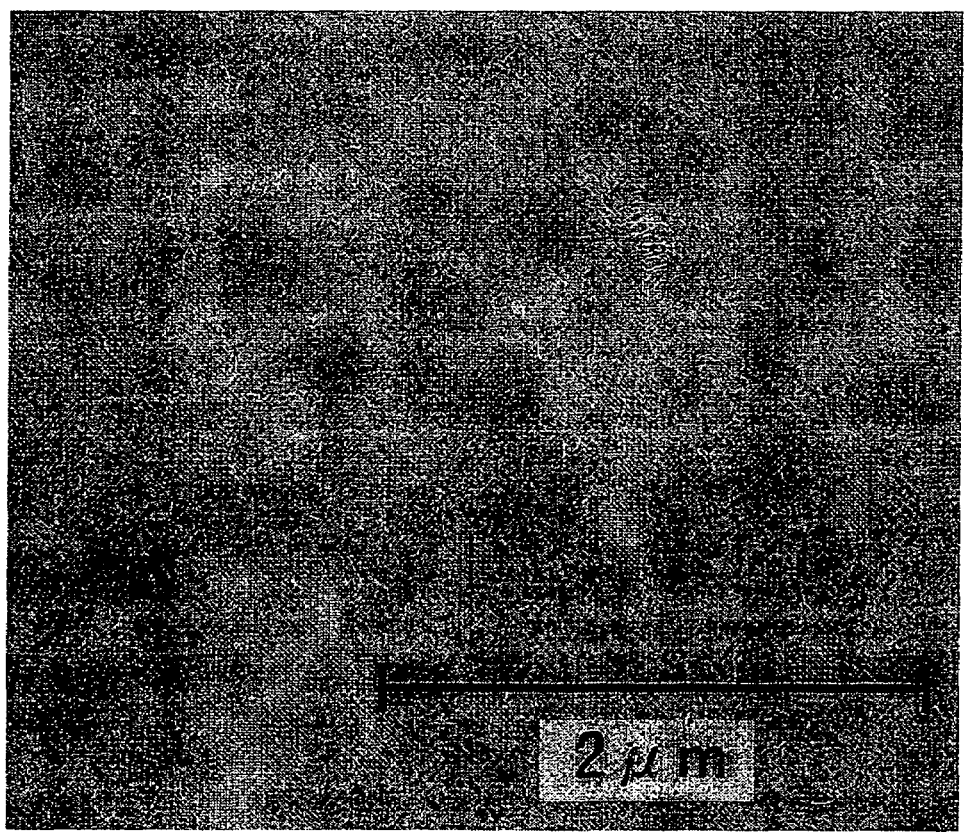
FIG. 13 is a photograph from an atomic force microscope showing an enlargement of the surface of the partitioned recording elements and the non-magnetic body of a magnetic recording disk from an example of the present invention.
Figure 14:
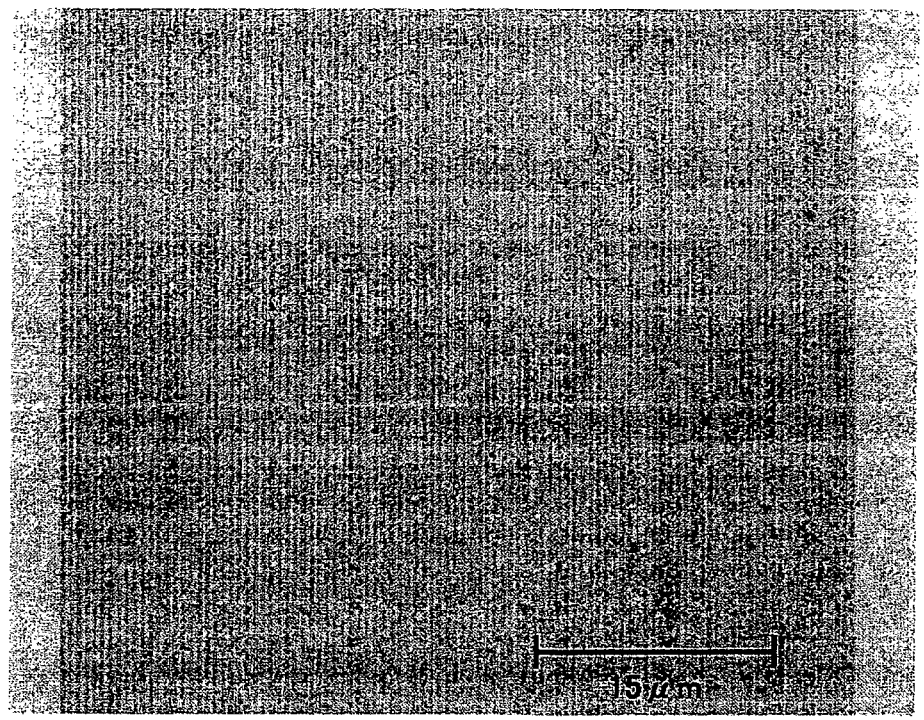
FIG. 14 is a photograph from an optical microscope showing an enlargement of the surface of the magnetic recording disk from the same example.

Using the embodiment described above, the processing devices provided inside the vacuum chamber were used to prepare a magnetic recording disk with the continuous recording layer and the partitioned recording elements isolated from the atmosphere. FIG. 13 is a photograph from an atomic force microscope showing an enlargement of the surface of the partitioned recording elements and the non-magnetic layer following smoothing by ion beam etching. Measurement of the surface roughness of the partitioned recording elements and the non-magnetic layer revealed a maximum level difference of 2.88 nm, and a center line average roughness Ra of 0.723 nm. These results confirm that in this example, the surface of the partitioned recording elements and the non-magnetic layer have been satisfactorily smoothed, without the use of a wet process such as CMP. Furthermore, when a surface defect inspection device was used to inspect the surface of the medium for foreign matter, two pieces of foreign matter of size 0.3 to 0.5 μm were identified. No foreign matter larger than 1.0 μm, nor any foreign matter of size 0.5 to 1.0 μm was found. In addition, the surface of the magnetic recording disk was observed through an optical microscope, both immediately following production, and then again after standing for approximately 48 hours in a high temperature, high humidity environment (temperature: 80° C., humidity: 80%), and on both occasions no corrosion of the partitioned recording elements was visible. FIG. 14 is a photograph from the optical microscope showing an enlargement of the surface of the magnetic recording disk of the example after standing for approximately 48 hours in the high temperature, high humidity environment.

COMPARATIVE EXAMPLE

Figure 15:
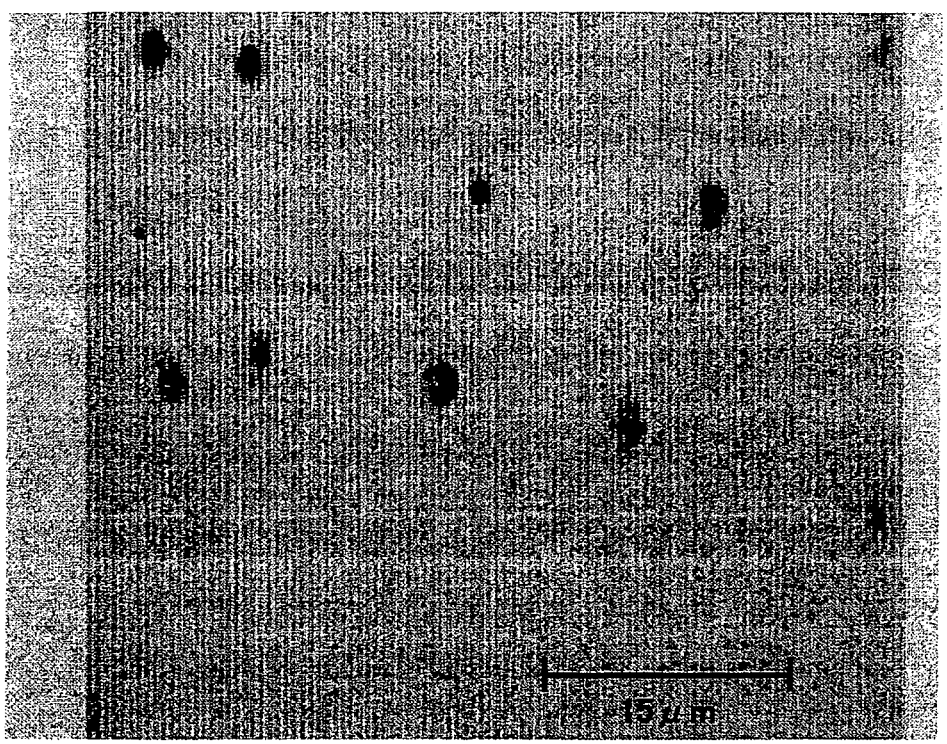
FIG. 15 is a photograph from an optical microscope showing an enlargement of the surface of a magnetic recording disk from a comparative example.

A magnetic recording disk was prepared in a similar manner to the example above, but with the exception that the processing devices were not housed inside a vacuum chamber, so that the continuous recording layer and the partitioned recording elements were permitted to come in contact with the atmosphere. When a surface defect inspection device was used to inspect the surface of the partitioned recording elements and the non-magnetic body for foreign matter, a total of 193 pieces of foreign matter, including 28 pieces of size 0.3 to 0.5 µm, 38 pieces of size 0.5 to 1.0 µm, and 127 pieces larger than 1.0 µm were identified. Furthermore, when the surface of the magnetic recording disk was observed through an optical microscope, both immediately following production, and then again after standing for approximately 48 hours in a high temperature, high humidity environment, although no corrosion of the partitioned recording elements was evident initially, after standing for 48 hours following production, a plurality of black spots were observed, indicating corrosion of the partitioned recording elements. FIG. 15 is a photograph from the optical microscope showing an enlargement of the surface of the magnetic recording disk of the comparative example after standing for approximately 48 hours in the high temperature, high humidity environment.

In other words, corrosion of the partitioned recording elements was prevented in the example, and the incorporation of foreign matter was also-markedly reduced when compared with the comparative example.

As described above, the present invention enables the efficient production of a discrete type magnetic recording medium with reliable prevention of any deterioration of the partitioned recording elements.

What is claimed is:

1. A method of producing a magnetic recording medium comprising:
   a recording layer processing step, which by forming a plurality of grooves, with a spacing therebetween in a planar direction, in an intermediate product produced by forming a continuous recording layer on top of a substrate surface, partitions said continuous recording layer into a plurality of partitioned recording elements;
   a non-magnetic body filling step for filling said grooves between said partitioned recording elements with a non-magnetic body; and
   a protective layer formation step for forming a protective layer that protects said partitioned recording elements and said non-magnetic body, wherein
   said recording layer processing step, said non-magnetic body filling step, and said protective layer formation step are conducted with an environment surrounding said intermediate product maintained in a state of vacuum all through these steps.

2. The method of producing a magnetic recording medium according to claim 1, wherein
   a dry process cleaning step, which uses either one of a gas and a plasma for removing foreign matter from an environment surrounding said partitioned recording elements, is provided between said recording layer processing step and said non-magnetic body filling step.

3. The method of producing a magnetic recording medium according to claim 1, wherein
   a smoothing step for smoothing a surface of said partitioned recording elements and said non-magnetic body is provided between said non-magnetic body filling step and said protective layer formation step.

4. The method of producing a magnetic recording medium according to claim 3, wherein
   said smoothing step is a dry plasma step which allows ions to collide with a surface of said partitioned recording elements and said non-magnetic body at an incidence angle that is restricted to a value within either one of a range from −10 to 150 and a range from 60 to 90°.

5. The method of producing a magnetic recording medium according to claim 4, wherein said dry plasma step uses ion beam etching.

6. The method of producing a magnetic recording medium according to claim 1, wherein
   in said recording layer processing step, said continuous recording layer is partitioned by reactive ion etching using carbon monoxide gas containing an added nitrogen based compound as a reactive gas.

7. The method of producing a magnetic recording medium according to claim 1, wherein
   in said non-magnetic body filling step, said non-magnetic body is used to fill said grooves between said partitioned recording elements using either one of plasma CVD with bias power to said intermediate product and bias sputtering.

8. The method of producing a magnetic recording medium according to claim 7, wherein
   said non-magnetic body filling step uses a material comprising any one selected from the group consisting of an oxide material, a nitride material, and a non-magnetic amorphous material as said non-magnetic body.

9. The method of producing a magnetic recording medium according to claim 8, wherein
   said non-magnetic body filling step uses silicon dioxide as said non-magnetic body.

10. The method of producing a magnetic recording medium according to claim 7, wherein
    a barrier film formation step, for forming a barrier film on said partitioned recording elements, is provided between said recording layer processing step and said non-magnetic body filling step.

11. The method of producing a magnetic recording medium according to claim 10, wherein
    said barrier film formation step forms a barrier film of diamond-like carbon.

* * * * *